US009323925B2

United States Patent
Klein

(10) Patent No.: US 9,323,925 B2
(45) Date of Patent: Apr. 26, 2016

(54) METHOD AND SYSTEM FOR PREVENTION OF WINDOWLESS SCREEN CAPTURE

(71) Applicant: TRUSTEER LTD., Tel Aviv (IL)

(72) Inventor: Amit Klein, Herzliya (IL)

(73) Assignee: TRUSTEER, LTD., Tel Aviv (IL)

( * ) Notice: Subject to any disclaimer, the term of this patent is extended or adjusted under 35 U.S.C. 154(b) by 166 days.

(21) Appl. No.: 13/905,650

(22) Filed: May 30, 2013

(65) Prior Publication Data

US 2014/0359766 A1 Dec. 4, 2014

(51) Int. Cl.

| | |
|---|---|
| ***G06F 21/55*** | (2013.01) |
| ***G06F 21/56*** | (2013.01) |
| ***G06F 21/36*** | (2013.01) |
| *G06F 21/12* | (2013.01) |

(52) U.S. Cl.

CPC .............. *G06F 21/554* (2013.01); *G06F 21/36* (2013.01); *G06F 21/56* (2013.01); *G06F 21/566* (2013.01); *G06F 21/121* (2013.01); *G06F 2221/032* (2013.01)

(58) Field of Classification Search

CPC ....... G06F 21/121; G06F 21/14; G06F 21/50; G06F 21/55; G06F 21/554; G06F 21/56; G06F 21/566

USPC ............................................................ 726/23

See application file for complete search history.

(56) References Cited

U.S. PATENT DOCUMENTS

| | | | | |
|---|---|---|---|---|
| 6,108,799 | A * | 8/2000 | Boulay | G06F 21/564 714/26 |
| 6,925,638 | B1 * | 8/2005 | Koved | G06F 8/433 717/155 |
| 7,818,800 | B1 | 10/2010 | Lemley | |
| 2006/0253584 | A1 * | 11/2006 | Dixon | G06Q 30/02 709/225 |
| 2007/0038677 | A1 * | 2/2007 | Reasor et al. | 707/200 |
| 2011/0271342 | A1 * | 11/2011 | Chung et al. | 726/23 |

FOREIGN PATENT DOCUMENTS

| | | |
|---|---|---|
| CN | 102394859 | 3/2012 |

OTHER PUBLICATIONS

Ulrich Bayer et al., "A View on Current Malware Behaviors," Apr. 21, 2009, XP055131733, retrieved from the Internet: https://www.cs.ucsb.edu/chris/research/doc/leet09_anubis.pdf.

European Search Report issued in corresponding EP Application No. 14170651.5 dated Jul. 25, 2014.

Kumar Bhupesh, "Synthesis of nanoparticules in laser ablation of aluminium in liquid", Journal of Applied Physics, (Sep. 21, 2010).

* cited by examiner

*Primary Examiner* — Robert Leung
*Assistant Examiner* — Ngoc D Nguyen
(74) *Attorney, Agent, or Firm* — Daniel J. Swirsky; AlphaPatent Associates Ltd.

(57) ABSTRACT

A method for preventing the acquisition of data by a screen capturing malware, comprises preventing an unidentified process that does not open a window from performing screen capture.

7 Claims, 2 Drawing Sheets

METHOD AND SYSTEM FOR PREVENTION OF WINDOWLESS SCREEN CAPTURE

FIELD OF THE DISCLOSURE

The present disclosure relates to the field of computer security. More particularly, the disclosure relates to the prevention of the acquisition of private user data by malware that employs screen capture techniques.

BACKGROUND OF THE DISCLOSURE

Screen capture is a very useful option available in most computer operating systems and one which the vast majority of users would not be willing to give up. Unfortunately, the screen capture option also opens the door for malware to acquire private information entered by the user on his screen. For instance, when a user accesses a bank account or other sensitive web location, the user may type confidential information into specific fields to acquire access. Malware that is installed on said user's computer can be activated when such a window is displayed and may capture the screen, thus also capturing confidential information that the malware may then forward to its creator.

Some security software deals with this problem simply by preventing the system from performing a screen capture under a variety of conditions which give rise to suspicion. However, this approach has the great disadvantage of resulting in many "false positive" identifications of potential malware attacks, which lead to a frustrating situation in which the user is not able to perform a screen capture when he needs to. These and other drawbacks exist.

SUMMARY OF THE DISCLOSURE

The present disclosure illustrates methods and software agents to alleviate the aforementioned problem and greatly reducing the number of false positives determinations. This will improve the user experience and maintain a high level of security.

The present disclosure may provide a simple and yet efficient method of preventing malicious screen capture events.

The present disclosure may provide simple software agents suitable to carry out the method of the disclosure.

Other objects and advantages of the disclosure will become apparent as the description proceeds.

DETAILED DESCRIPTION

Figure 1:
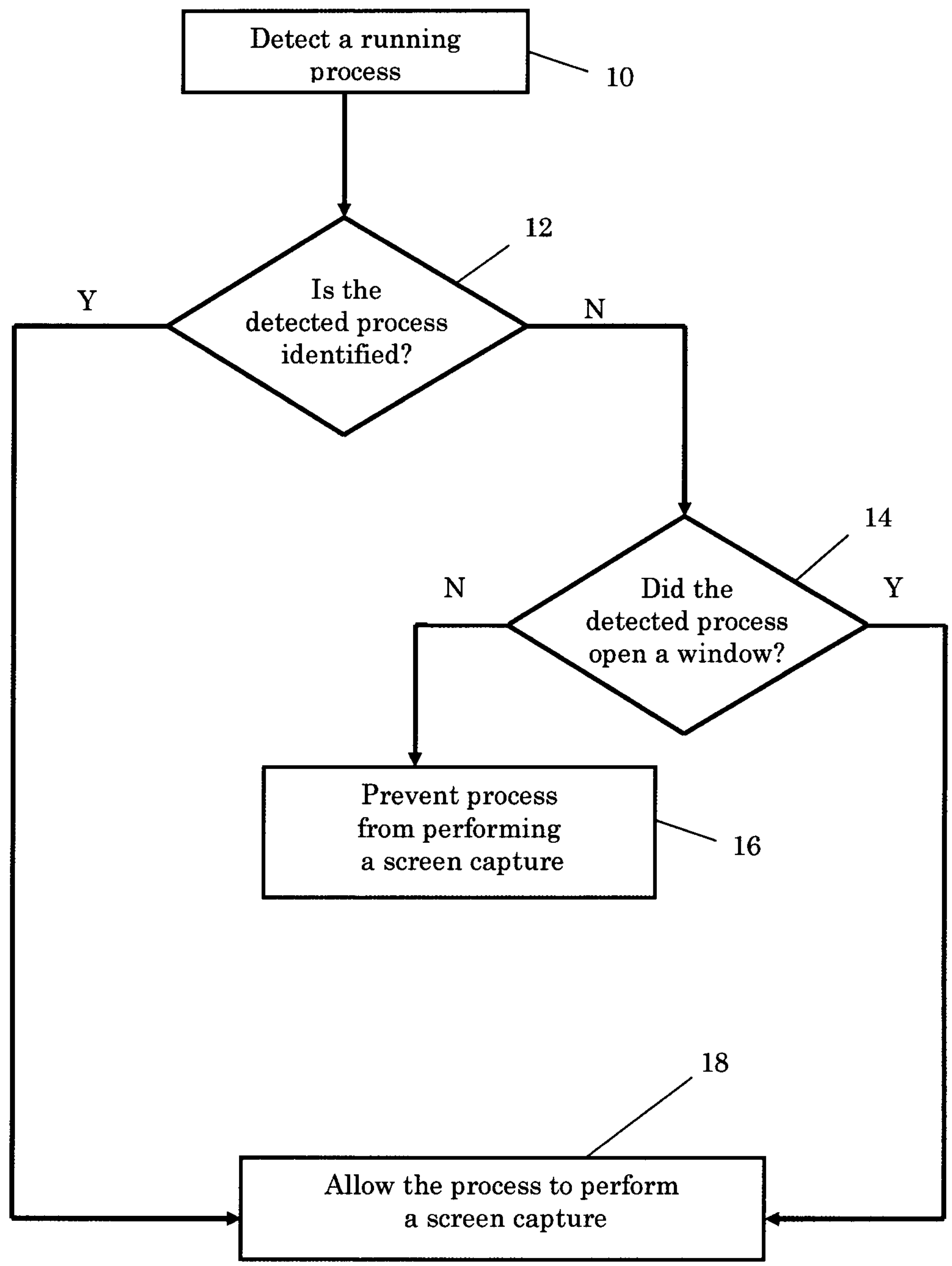
FIG. 1 is a flowchart illustrating the process of preventing the acquisition of data by a malware through the use of a screen capture.

One aspect the disclosure relates to a method for preventing the acquisition of data by a malware through the use of a screen capture approach, comprising preventing an unidentified process that does not open a window from performing screen capture.

According to an exemplary embodiment, the process is unidentified if it is not comprised in a white list. In this embodiment of the disclosure the white list may be constantly updated, to avoid too many instances in which legitimate process may be considered a potential threat.

According to another embodiment, a software agent may be useful in preventing a malware from acquiring data by performing a screen capture, where the software agent is configured to analyze a process to determine whether it does or does not open a window.

Another embodiment is directed to a system for preventing the acquisition of data by a malware through the use of a screen capture, comprising the software agent of the disclosure and a white list of non-malicious processes that do not open a window. In an exemplary embodiment, the system operates such that the white list may be a dynamic list, which may be updated by external input, or according to data generated within the system.

While reference will be made in the description to follow to a Microsoft Windows-based system, the skilled person will appreciate that the method of the disclosure can be applied, mutatis mutandi, to other operating systems. According to the disclosure, the only two types of processes that may perform a screen capture are 1) processes that by themselves open a window; and 2) processes that have been white listed, as further discussed below.

It has been found that the vast majority of malicious processes that are programmed to steal information by performing screen captures do not open a window in the user's system. Such malicious agents (i.e., malware) operate by stealth and without being noticed by the user or by a system that is not equipped with appropriate software protection.

A variety of software utilities exist, which may be used to detect that a process has an open window and, thus, is deemed to be legitimate. An example of such a utility supplied by Microsoft Corporation is Spy++, which is a part of Visual Studio and is a Win32-based utility that gives a graphical view of the systems processes, threads, windows and window messages. For ease of reference, a third-party utility that identifies the opening the windows is the well-known Spy++ utility. However, for the purpose of disclosure it is not necessary to use third-party utilities and the embodiments may be carried out to create an agent according to the disclosure, which may determine whether a process that is being inspected is or is not opening a window.

The system according to an exemplary embodiment may comprise at least the software agent that inspects processes to determine whether there is an open window, and a white list of non-malicious processes. The system may contain additional components, agents and elements, which are not part of the present disclosure and, therefore, are not discussed herein in detail for the sake of brevity.

In one embodiment, the danger of determining false positives may be reduced by providing and updating a "white list" of programs that do not open windows and yet are safe and non-malicious. According to this embodiment, when a process is attempting to perform a screen capture and the software agent determines that the process does not own an open window, the screen capture may be prevented if said process is not in the white list.

The white list may be a dynamic list that is updated as additional windowless processes that are not malicious. In an exemplary embodiment, the dynamic list may be updated with external data, for instance periodic updates received from a repository external to the system employed to guard the user's operating system from malicious attacks. In another embodiment, however, the dynamic list may be updated using data generated by the system of disclosure itself. For example, one embodiment may, upon detection of a screenshooting attempt from a windowless process, consult the user whether this process should be white-listed or not. According to another embodiment of disclosure, the Agent can keep track of processes and monitor them for window usage. So, if a process does not own a window at present, but did own a visible window at some point in the past, it will not be deemed a windowless process for purposes of screenshooting protection.

FIG. 1 is a flowchart illustrating the process of preventing the acquisition of data by a malware through the use of a screen capture. At the first step 10, the agent monitors the computer and detects running processes. At the next step 12, the agent checks whether or not an examined process is identified. If an examined process is identified, the process is allowed to perform a screen capture. If not, at the next step 14 the agent checks if the examined process attempts to open a window. If not, at the next step 16 the agent prevents the examined process from performing a screen capture. If the examined process did open a window, at the next step 18 the examined process is allowed to perform a screen capture.

Figure 2:
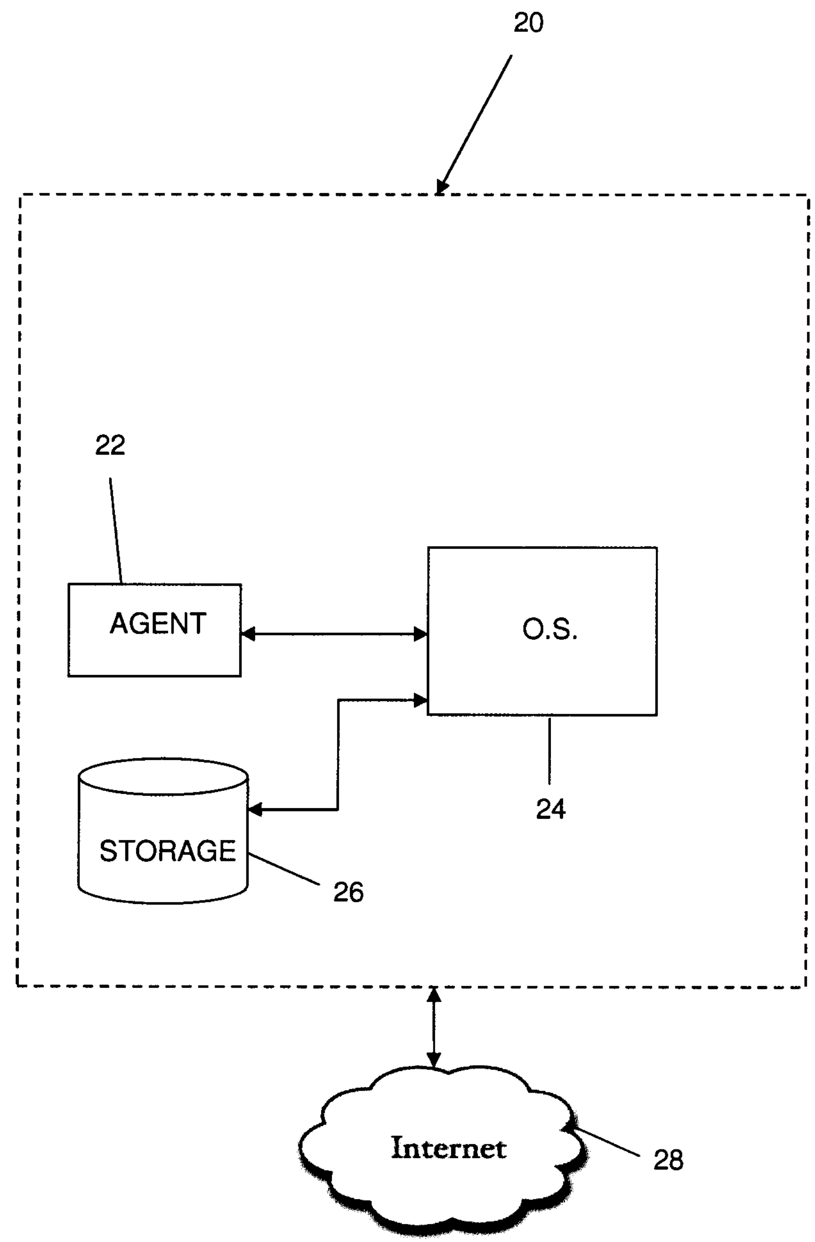
FIG. 2 illustrates a system for preventing the acquisition of data by a malware through the use of a screen capture.

FIG. 2 illustrates a system for preventing the acquisition of data by a malware through the use of a screen capture. The system 20 comprises a data storage unit 26 that houses a white list of non-malicious processes that do not open a window, a software agent 22 that is configured to analyze a process that runs on a computer, to determine whether the process opens a window and if the process is not listed on the white list and does not open a window, to prevent the process from performing a screen capture.

The dynamic list may be updated by external inputs received over a data network 28 such as the internet, to which the system 20 may be connected.

EXAMPLE

Discriminating Between Malicious and Non-Malicious Processes

An example of a malicious process is the recently discovered FAKEM RAT (http://www.trendmicro.com/cloud-content/us/pdfs/security-intelligence/white-papers/wp-fakem-rat.pdf), which uses its own process ("the malware typically copies itself using the name, tpframe.exe, to the %System% folder"), and is capable of taking screenshots ("takes a snapshot of the desktop").

In contrast, various remote management software (e.g. Symantec PC-Anywhere) need to take screenshots of the user's desktop, while (in some cases) not having a visible window at such time.

By using the exemplary embodiments, it is possible to discriminate between a non-malicious management software, which is identified as non-malicious by its behavior, because at least some of its windows are visible and/or because they have been white-listed and malicious processes. The exemplary embodiments provide a simple and yet efficacious tool to fight malicious attacks of the type discussed above.

All of the above examples and explanations have been provided for the purpose of illustration and are not intended to limit the disclosure in any way. For instance, many different ways can be devised to determine whether a process does or does not open a window, with different operating systems or versions of operating systems, all without exceeding the scope of the disclosure.

The invention claimed is:

1. A method for preventing the acquisition of data by a malware through the use of a screen capture approach, comprising:
- detecting, on a computer, a process;
- monitoring, on the computer, the process to detect when the process attempts to open a window; and
- when the process attempts to perform a screen capture,
  - determining, on the computer, that the process is an unidentified process,
  - determining, on the computer, that the process has not attempted to open a window, and
  - preventing the unidentified process from performing the screen capture if the unidentified process has not attempted to open a window.

2. The method according to claim 1, wherein determining that the process is an unidentified process comprises determining when the process is not in a white list.

3. A computer program product for preventing a malware from acquiring data by performing a screen capture, the computer program product comprising:
- a non-transitory computer-readable medium; and
- computer-readable program code embodied in the computer-readable medium, wherein the computer-readable program code is, when executed by a processor, configured to cause the processor to
  - detect a process,
  - monitor the process to detect when the process attempts to open a window, and
  - when the process attempts to perform a screen capture,
    - determine that the process is an unidentified process,
    - determine that the process has not attempted to open a window, and
    - prevent the unidentified process from performing the screen capture if the unidentified process has not attempted to open a window.

4. A system for preventing the acquisition of data by a malware through the use of a screen capture, the system comprising:
- a data storage device housing a white list of processes that attempts to open a window; and
- a software agent configured to:
  - detect, on a computer, a process,
  - monitor the process to detect when the process attempts to open a window, and
  - when the process attempts to perform a screen capture,
    - determine, on the computer, that the process is an unidentified process,
    - determine, on the computer, that the process has not attempted to open a window,
    - determine if the process is listed on the white list; and
    - prevent the unidentified process from performing the screen capture if the unidentified process has not attempted to open a window and is not listed on the white list.

5. The system according to claim 4, wherein the white list is a dynamic list.

6. The system according to claim 5, wherein the dynamic list is updated by external input.

7. The system according to claim 5, wherein the dynamic list is updated according to data generated within the system.

* * * * *